United States Patent
Larignon

(10) Patent No.: US 11,115,807 B2
(45) Date of Patent: Sep. 7, 2021

(54) METHOD FOR ASSISTANCE WITH THE REMOTE CONFIGURATION OF AN EUICC CARD AND SYSTEM FOR IMPLEMENTING SUCH A METHOD

(71) Applicant: SIGFOX, Labege (FR)

(72) Inventor: Guillaume Larignon, Labege (FR)

(73) Assignee: SIGFOX, Labege (FR)

( * ) Notice: Subject to any disclaimer, the term of this patent is extended or adjusted under 35 U.S.C. 154(b) by 0 days.

(21) Appl. No.: 16/764,870

(22) PCT Filed: Nov. 20, 2018

(86) PCT No.: PCT/EP2018/081956
§ 371 (c)(1),
(2) Date: May 17, 2020

(87) PCT Pub. No.: WO2019/101748
PCT Pub. Date: May 31, 2019

(65) Prior Publication Data
US 2020/0344594 A1    Oct. 29, 2020

(30) Foreign Application Priority Data
Nov. 21, 2017   (FR) ...................................... 1761023

(51) Int. Cl.
*H04W 8/20* (2009.01)
*H04W 64/00* (2009.01)
*H04W 88/06* (2009.01)
*H04W 12/63* (2021.01)
*H04W 12/42* (2021.01)
*H04W 12/30* (2021.01)
(Continued)

(52) U.S. Cl.
CPC ........... *H04W 8/205* (2013.01); *H04W 8/183* (2013.01); *H04W 12/35* (2021.01); *H04W 12/40* (2021.01); *H04W 12/42* (2021.01); *H04W 64/00* (2013.01); *H04W 12/63* (2021.01); *H04W 88/06* (2013.01)

(58) Field of Classification Search
CPC ..... H04W 8/205; H04W 64/00; H04W 88/06; H04W 12/63; H04W 12/42; H04W 12/35; H04W 8/183; H04W 12/40
USPC ............................... 455/418–420, 450–452.2
See application file for complete search history.

(56) References Cited

U.S. PATENT DOCUMENTS

| | | | | |
|---|---|---|---|---|
| 2013/0157673 A1* | 6/2013 | Brusilovsky | .......... | H04W 12/06 455/450 |
| 2014/0004827 A1* | 1/2014 | O'Leary | ............... | H04W 12/35 455/411 |

(Continued)

FOREIGN PATENT DOCUMENTS

EP           2 680 628 A1        1/2014

*Primary Examiner* — Michael Y Mapa
(74) *Attorney, Agent, or Firm* — Im IP Law; Chai Im; C. Andrew Im

(57) ABSTRACT

A terminal provided with an eUICC card having an incomplete provisioning profile. At least one missing datum essential to the establishment of a communication between the terminal and an access network of a first wireless communication system is not defined by default in the provisioning profile. In order to remotely configure the eUICC card, prior communication is established between the terminal and an access network of a second wireless communication system to transmit the missing data to complete the provisioning profile.

14 Claims, 6 Drawing Sheets

(51) Int. Cl.
*H04W 8/18* (2009.01)
*H04W 12/40* (2021.01)

(56) References Cited

U.S. PATENT DOCUMENTS

2016/0020803 A1\* 1/2016 Cha ..................... H04W 8/205
                                                          455/558
2016/0269386 A1\* 9/2016 Nix ..................... H04L 9/0869
2019/0364416 A1\* 11/2019 Dumoulin ............. H04W 8/205

\* cited by examiner

METHOD FOR ASSISTANCE WITH THE REMOTE CONFIGURATION OF AN EUICC CARD AND SYSTEM FOR IMPLEMENTING SUCH A METHOD

RELATED APPLICATIONS

This application is a § 371 application of PCT/EP2018/081956 filed Nov. 20, 2018, which claims priority from French Patent Application No. 17 61023 filed Nov. 21, 2017, each of which is incorporated herein by reference in its entirety.

TECHNICAL FIELD

The present invention belongs to the field of smart cards used in mobile telephony to store information specific to a subscription to a mobile telephone network. More particularly, the invention relates to a method for remote configuration of such a smart card.

BACKGROUND OF THE INVENTION

A SIM (acronym for "Subscriber Identity Module") card is an electronic chip containing a microcontroller and memory used in mobile telephony to store and manage information relating to a subscription with a mobile telephone network operator such as for example GSM (acronym for "Global System for Mobile Communications"), UMTS (acronym for "Universal Mobile Telecommunications System"), LTE (acronym for "Long Term Evolution") networks, etc.

Conventionally, a SIM card is intended to be inserted into a mobile phone by a user who has just taken out a subscription. If the user subsequently changes mobile telephone network operator and/or subscription, he can then replace it with a new SIM card which contains the information related to his new subscription. There are different SIM card formats that have evolved with the development and miniaturisation of mobile phones.

However, having to change the SIM card to modify a subscription or to adapt to a new model of mobile phone entails delays for the user and costs for the operator.

Furthermore, conventional SIM cards are poorly adapted to M2M (acronym for "Machine To Machine") type terminals or to connected things of the "Internet of Things" (or IoT) type which are for example connected to the Internet through mobile telephone access networks (for example, it may be a remote reading or remote monitoring device, a wireless communication module of an autonomous car, a connected wireless sensor for "smart city", etc.). The insertion and replacement of SIM cards for M2M or IoT type terminals indeed generate significant logistical costs which are a real obstacle for the economic model related to this type of product. In addition, these terminals often have mechanical constraints or miniaturisation requirements which make access to the SIM card particularly difficult, when it is not the terminals themselves which are not accessible.

This is why the GSMA (acronym for "GSM Association", an international association of mobile phone operators) has developed standards introducing a non-removable SIM card known as eUICC (acronym for "Embedded Universal Integrated Circuit Card") or eSIM (for "Embedded SIM") as well as the solutions allowing to remotely modify the content and therefore the operation of said non-removable SIM card.

The standards related to the eUICC developed by the GSMA in particular define two different models. The first model is for devices intended for the general public, such as a mobile phone, a touch pad, a watch or a connected bracelet, etc. A feature of this model is that the remote configuration of the eUICC card is initiated by a user and is based on communication means provided by this user, such as for example a Wi-Fi connection. However, the second model is intended for M2M type devices for which the remote configuration of the eUICC card is carried out without the intervention of a user.

In the particular case of the model intended for M2M type terminals, the eUICC card must include the minimum information necessary for establishing wireless communication for a first remote configuration of the card. This minimum information is stored in the card memory in a "provisioning profile". As for configuration information relating to a commercial subscription with a mobile telephone network operator, they are stored in an "operational profile". A non-removable SIM card of the eUICC type then contains at least one active provisioning profile and optionally one or more operational profiles capable of being activated later. The provisioning profile is used to configure the eUICC card remotely during the first connection, and possibly during a backup connection in the event that an operational profile is suddenly no longer functional. An operational profile is in turn downloaded and/or activated remotely during a card configuration procedure, and it is then used to establish communications between the terminal and the mobile telephone network according to the subscription. Only one profile can be activated at a given time. An operational profile can act as a provisioning profile, but the opposite is not generally true.

Among the minimum necessary information contained in the provisioning profile there is in particular a unique number allowing a mobile telephone network to identify a user (this is IMSI, acronym for "International Mobile Subscriber Identity"), and an authentication key (known as Ki). These resources are recorded in the provisioning profile of the eUICC card at the time of its manufacture, and they are reserved by the mobile telephone network operator which is responsible for supporting the first connection and any backup connections during the entire life cycle of the eUICC card. However, it turns out that it is particularly expensive for a mobile telephone network operator to permanently provision this kind of resources while they are only used for short procedures and in infrequent situations.

SUMMARY OF THE INVENTION

The present invention has the purpose of overcoming all or part of the disadvantages of the prior art, in particular those set out above.

To this end, and according to a first aspect, the present invention relates to a remotely configurable smart card intended to be non-removably integrated into a terminal, called an eUICC card, storing a provisioning profile including data used by said terminal to communicate with an access network of a first wireless communication system, called a provisioning network, in order to install and/or activate on said eUICC card an operational profile including data relating to a subscription taken out by a user of the terminal with an operator of another access network of said first wireless communication system, called operational network. Furthermore, the provisioning profile of said eUICC card is incomplete, in other words one or more missing data essential for establishing a communication between the terminal and the provisioning network are not defined by default in the provisioning profile initially saved on the eUICC card. The eUICC card is configured to complete the provisioning profile with the missing data obtained by the terminal by establishing a prior communication with an access network of a second wireless communication system, called assistance network, said second wireless communication system being distinct from said first wireless communication system.

In particular, such arrangements allow a provisioning network operator of the first wireless communication system to avoid having to reserve some expensive resources in equipment of its network during periods when they are not useful.

In particular embodiments, the invention may further include one or more of the following features, taken separately or in any technically possible combination.

In particular embodiments, the eUICC card further includes an assistance profile including data allowing said terminal to access said assistance network.

In particular embodiments, the data missing from the provisioning profile include the at least one of the following elements:
  an indication that the provisioning profile is active,
  at least part of a unique identifier, called IMSI, of the provisioning profile with the provisioning network,
  an identifier of an authentication algorithm and/or an authentication key, called key Ki, of the provisioning profile,
  an identifier of an access network of the first wireless communication system, called roaming network, linked to the provisioning network.

Such arrangements can in particular allow selecting a roaming network for which the agreements of roaming to the provisioning network are the most advantageous in terms of cost at the time when the remote configuration of the eUICC card takes place. This choice can for example be made according to the geographical position of the terminal if this information is available.

In particular embodiments, the provisioning profile includes a set of possible values preconfigured for at least one missing datum, and an identifier of a value of said set is obtained through said prior communication established between the terminal and the assistance network.

Such arrangements allow in particular reducing the size of the data transmitted by the assistance network to the terminal.

In particular embodiments, the eUICC card includes several incomplete provisioning profiles, and it is configured to determine a provisioning profile to be used from an identifier obtained through the prior communication established between the terminal and the assistance network.

Such arrangements can in particular allow selecting a particularly advantageous provisioning profile in terms of cost when the remote configuration of the eUICC card takes place. This choice can for example be made according to the geographical position of the terminal if this information is available.

According to a second aspect, the present invention relates to a terminal including an eUICC card according to any one of the preceding embodiments.

In particular embodiments, the terminal is configured to determine an information on a current geographical position of the terminal and to transmit this information to the assistance network through said prior communication.

According to a third aspect, the present invention relates to an assistance network for a terminal according to any one of the preceding embodiments. Said assistance network is linked to a subscription management entity, and configured to obtain from said subscription management entity and to transmit to said terminal data missing from an incomplete provisioning profile of the eUICC card of the terminal.

In particular embodiments, the invention may further include one or more of the following features, taken separately or in any technically possible combination.

In particular embodiments, the assistance network is configured to provide an information on a current geographical position of the terminal to the subscription management entity.

In particular embodiments, the assistance network is a low power wide area wireless communication network. "Wide area network" and "low power" mean a network of the LPWAN type (acronym for "Low Power Wide Area Network") whose bit rates are less than 100 kbits/s. Such networks generally have costs for an operator much lower than those of a mobile telephone network of the GSM, UMTS or LTE type.

According to a fourth aspect, the present invention relates to a subscription management entity for an eUICC card of a terminal according to any one of the preceding embodiments. Said subscription management entity is linked to an assistance network according to any one of the preceding embodiments, and it is configured to provide said assistance network with data missing from an incomplete provisioning profile of the eUICC card of the terminal.

In particular embodiments, the subscription management entity is configured to determine at least one of the data missing from an incomplete provisioning profile of the eUICC card according to an information on a current geographical position of the terminal.

According to a fifth aspect, the present invention relates to a system including a subscription management entity according to any one of the preceding embodiments, at least one terminal according to any one of the preceding embodiments, as well as a first and a second distinct wireless communication systems, said second wireless communication system including an assistance network according to any one of the preceding embodiments.

According to a fifth aspect, the present invention relates to an assistance method for remotely configuring an eUICC card of a terminal, implemented by a system according to any one of the preceding embodiments, and including the following main steps:
  sending a request by the terminal on the assistance network of the second wireless communication system to complete a provisioning profile of said eUICC card,
  obtaining data missing from said provisioning profile by the assistance network from the subscription management entity,
  sending the obtained information to the terminal on the assistance network,
  updating, by the eUICC card, the provisioning profile with the obtained information,
  remotely configuring the eUICC card through a provisioning network of said first wireless communication system using the completed provisioning profile.

In particular embodiments, at least part of the information obtained by the assistance network from the subscription management entity is defined according to an information on a current geographical position of the terminal.

BRIEF DESCRIPTION OF THE FIGURES

The invention will be better understood upon reading the following description, given as a non-limiting example, and made with reference to FIGS. 1 to 6 which represent.

In these figures, identical reference numerals from one figure to another designate identical or similar elements. For the sake of clarity, the elements shown are not to scale, unless otherwise stated.

DETAILED DESCRIPTION OF EMBODIMENTS

Figure 1:
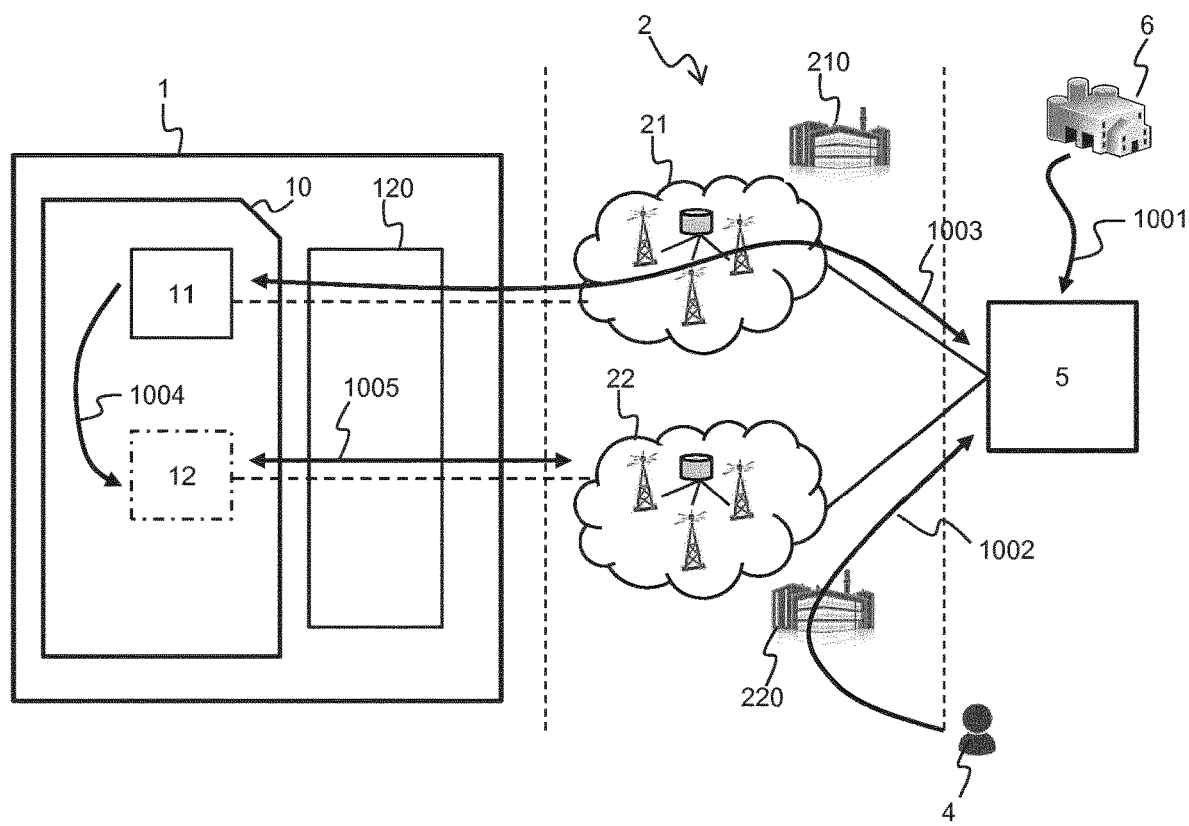
FIG. 1: a schematic representation of a first example of remote configuration of an eUICC card according to GSMA standards.

FIG. 1 schematically shows how an eUICC card 10 of a terminal 1 can be remotely configured according to procedures defined by the GSMA standards relating to non-removable SIM cards such as "Embedded SIM Remote Provisioning Architecture (Version 1.1, 17 Dec. 2013)" or "Remote Provisioning Architecture for Embedded UICC Technical Specification (Version 3.1, 27 May 2016)". More particularly, FIG. 1 describes as a non-limiting example the procedure by which a new operational profile 12 can be downloaded, installed and activated remotely on an eUICC card 10.

An eUICC card 10 includes at least one provisioning profile 11 containing applications and data allowing a terminal 1 to communicate with an access network of a first wireless communication system 2, called a provisioning network 21.

In the following description, the case where said first wireless communication system 2 is a cellular mobile telephone network such as GSM, UMTS or LTE networks is considered as a non-limiting example.

In the following description, "access network 21, 22" means a sub-network of a wireless communication system 2 managed by an operator 210, 220. Such an access network 21, 22 comprises all the telecommunication means used to link a terminal 1 to a switch of an infrastructure network such as the Internet for example. Such an access network 21, 22 comprises, for example, base stations and other equipment of a cellular mobile telephone network used for routing and multiplexing data, for locating and roaming subscribers, etc.

To communicate with said first wireless communication system 2, the terminal 1 includes a communication module 120 which conventionally includes a set of hardware and/or software means considered to be known to the person skilled in the art, to send and receive messages exchanged between the terminal 1 and an access network 21, 22 of the first wireless communication system 2. The terminal 1 can for example be a mobile phone, a touch pad, or else a connected thing of the M2M or IoT type, intended to be connected to an access network 21, 22 of the first wireless communication system 2.

The eUICC card 10 can further include one or more operational profiles 12 each containing applications and data relating to a subscription taken out by a user 4 of the terminal 1 with an operator 220 of an access network 22 of the first wireless communication system 2, called operational network 22.

The role of a provisioning profile 11 of an eUICC card 10 of a terminal 1 is exclusively to allow access of said terminal 1 to a provisioning network 21 for the purpose of establishing communications between the terminal 1 and a subscription management entity 5 aiming at remotely configuring said eUICC card 10.

The role of an operational profile 12 of an eUICC card 10 of a terminal 1, on the other hand, allows said terminal 1 to access an operational network 22 providing, according to the subscription associated with said operational profile 12 subscribed by the user 4 with the operator 220 of the operational network 22, commercial services such as internet access, messaging or mobile telephone services, etc.

The subscription management entity 5 supports, for example, the preparation and transport functions over the air (OTA transport, from "Over The Air") of the profiles 11, 12 to be installed on the eUICC card 10. These are in particular the roles of the SM-DP ("Subscription Manager Data Preparation") and SM-SR ("Subscription Manager Secure Routing") entities described by the GSMA standards. The subscription management entity 5 allows remotely configuring an eUICC card 10 through various procedures such as, for example, downloading and installing a new profile 11, 12, or activating, deactivating, erasing or updating some parameters of a particular profile 11, 12.

Among the applications and the data of a profile 11, 12 of the eUICC card 10 allowing the terminal 1 to communicate with an access network 21, 22 of the wireless communication system 2 there are in particular:

a unique number allowing the identification of the subscription of the user 4 with an operator 210, 220, called IMSI number, an authentication key, called key Ki, an application configured to allow the authentication of the user 4 when connecting to the access network 21, 22 using the IMSI number and the key Ki.

These elements, defined for example by the standards ITU E.212, ETSI TS 102 221, 3GPP TS 21.111, TS 31.102, etc., are well known to the person skilled in the art.

In the scenario shown as a non-limiting example in FIG. 1, the eUICC card 10 of the terminal 1 initially includes only one provisioning profile 11. In this scenario, it is assumed that a manufacturer 6 of the eUICC card 10 has previously made an agreement with the operator 210 of the provisioning network 21 so that the provisioning profile 11 allows establishing communication between the terminal 1 and said provisioning network 21. In particular, an IMSI number and an authentication key Ki are allocated and reserved in equipment of the provisioning network 21 such as for example an HLR (from "Home Location Register", a central database including the information related to any subscriber authorised to use the network 21), or an AuC (from "Authentication Centre", an authentication centre often associated with an HLR). The provisioning profile 11 including this data is installed by the manufacturer 6 on the eUICC card 10 during the production of the eUICC card 10, then the eUICC card 10 is then provided to a terminal 1 manufacturer who then integrates said eUICC card 10 into the terminal 1.

In a step 1001, the manufacturer 6 records in the subscription management entity 5 all the data necessary for establishing a communication between the terminal 1 and the subscription management entity 5 through the provisioning network 21, in particular: the IMSI number associated with the provisioning profile 11, a unique identifier of the eUICC card 10, called EID (eUICC-ID), and authentication data allowing to secure the communication between the eUICC card 10 of the terminal 1 and the subscription management entity 5.

In a step 1002, a user 4 who has acquired the terminal 1 takes out a subscription with an operator 220 of an operational network 22. The operator 220 then provides the subscription management entity 5 with all the data necessary to create on the eUICC card 10 an operational profile 12 allowing the terminal 1 to access the operational network 22.

In a step 1003, the subscription management entity 5 establishes a secure communication with the eUICC card 10 of the terminal 1 through the provisioning network 21 to download and activate the operational profile 12 on the eUICC card 10. As defined in the GSMA standards, the secure communication established between the subscription management entity 5 and the eUICC card 10 can, for example, be based on an HTTPS (acronym for "HyperText Transfer Protocol Secure") session initiated by an SMS (acronym for "Short Message Service") message.

In a step 1004, the eUICC card 10 installs the operational profile 12. Then, it deactivates the provisioning profile 11 and activates the operational profile 12.

In a step 1005, the eUICC card 10 is now capable of communicating with the operational network 22.

It should be noted that in FIG. 1, the provisioning network 21 and the operational network 22 are two distinct access networks of the first wireless communication system 2. However, in one variant, nothing prevents the provisioning network 21 and the operational network 22 from being a single access network of the first wireless communication system 2.

The GSMA standards provide that several profiles 11,12 can be installed on the eUICC card 10. However, only one profile 11,12 can be active at a given instant. On the other hand, an operational profile 12 can act as a provisioning profile 11. Thus, for the scenario described with reference to FIG. 1, after step 1005, it is the operational profile 12 which will act as a provisioning profile for a possible subsequent configuration of the eUICC card 10. On the other hand, a provisioning profile 11 originally installed by a manufacturer 6 on an eUICC card generally provides only very limited services, and consequently it cannot act as an operational profile 12. A manufacturer 6 can also install one or more operational profiles 12 on the eUICC card 10 as soon as the card is produced. Such an operational profile 12 can be remotely activated via a provisioning profile 11 which is also installed and activated by the manufacturer 6 during the production of the card. Alternatively, an operational profile 12 can also be activated as soon as the card is produced, and then it acts as a provisioning profile 11 for possible subsequent configurations of the eUICC card 10.

Figure 2:
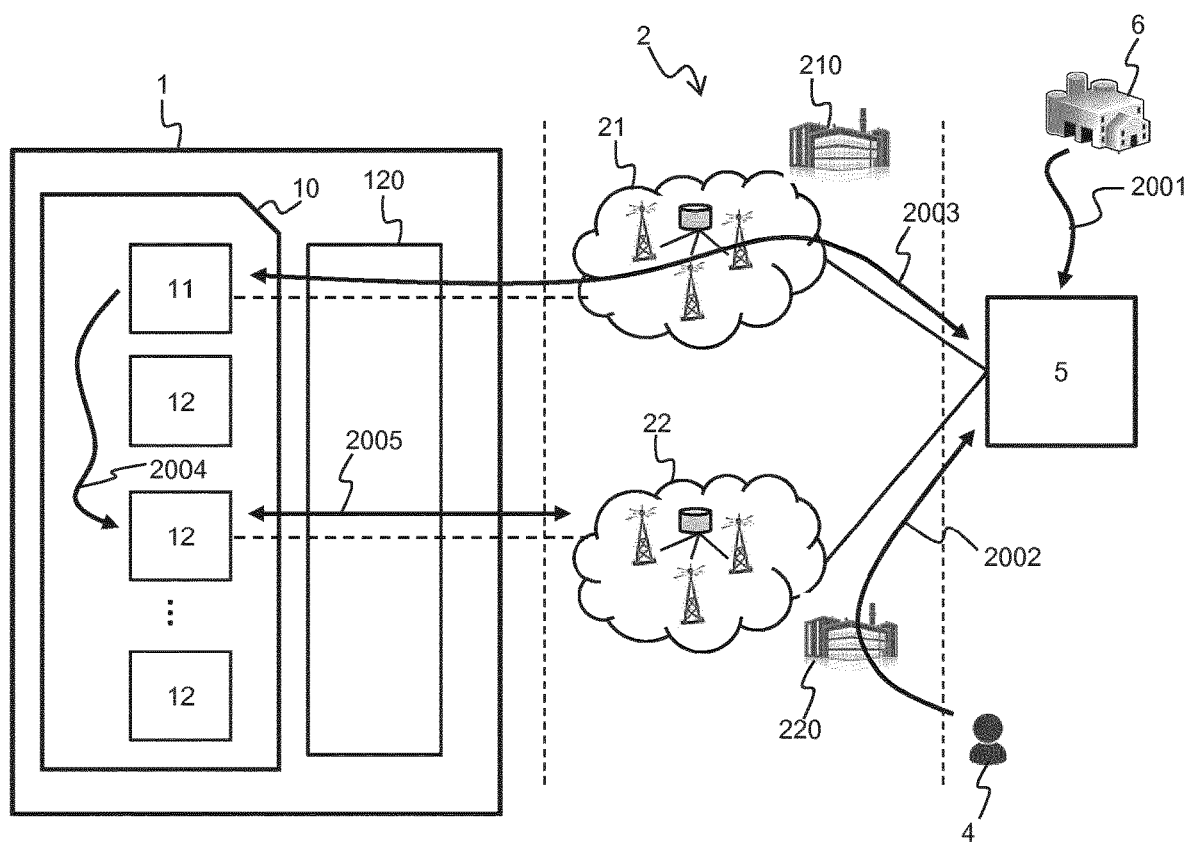
FIG. 2: a schematic representation of a second example of remote configuration of an eUICC card according to GSMA standards.

FIG. 2 schematically shows a second example of a procedure for remotely configuring an eUICC card 10 provided by the GSMA standards. More particularly, FIG. 2 describes the procedure by which an operational profile 12 already installed on an eUICC card 10 can be remotely activated.

In the scenario shown as a non-limiting example in FIG. 2, the eUICC card 10 of the terminal 1 initially has a provisioning profile 11 and several operational profiles 12 installed by the manufacturer 6 during the production of the card. Initially, only the provisioning profile 11 is activated. In this scenario, it is assumed that the manufacturer 6 has previously made, for each profile 11, 12, an agreement with the operator 210, 220 of the access network 21, 22 associated with said profile 11, 12 in order to allow, without prejudice, if necessary, to the activation of said profile 11, 12, to establish a communication between the terminal 1 and said access network 21, 22.

To simplify the figure, only two access networks 21, 22 were shown. It should however be considered that an access network is associated with each profile 11,12 of the eUICC card 10.

In a step 2001, the manufacturer 6 provides the subscription management entity 5 with all the data associated with the different profiles 11, 12 installed on the eUICC card 10, as well as the EID and authentication data allowing to secure a communication between the eUICC card 10 of the terminal 1 and the subscription management entity 5.

In a step 2002, the user 4 of the terminal 1 indicates to an operator 220 of an operational network 22 that he wishes to activate the operational profile 12 associated with this operational network 22. The operator 220 then provides this information to the subscription management entity 5.

In a step 2003, the subscription management entity 5 establishes a secure communication with the eUICC card 10 of the terminal 1 through the provisioning network 21 to order activation of the desired operational profile 12.

In a step 2004, the eUICC card 10 deactivates the provisioning profile 11 and activates the desired operational profile 12.

In a step 2005, the eUICC card 10 is now capable of communicating with the operational network 22.

Again, it should be noted that the initial provisioning profile 11 can also be an operational profile 12. Also, the provisioning network 21 and the operational network 22 can be a single access network. Finally, in the example described with reference to FIG. 2, it is considered that the operational profiles 12 present on the eUICC card 10 were installed by the manufacturer 6 at the time of production of the eUICC card 10. However, nothing prevents, according to another example, that some or even all of these operational profiles 12 have been installed by a succession of download and installation procedures similar to that described with reference to FIG. 1.

The GSMA standards also provide that a provisioning profile 11 of the eUICC card 10 acts as a backup profile in the event that the connectivity of the terminal 1 with an activated profile 12 is permanently lost, that is to say for the case where the terminal 1 can no longer establish communication with an access network 21, 22 associated with the activated profile 12. In such a case, the eUICC card 10 can autonomously decide to deactivate the inoperative profile 12 and activate the backup profile.

The procedures for remotely configuring an eUICC card 10 defined by the GSMA standards, however, have the major disadvantage for an operator 210 of a provisioning network 21 of having to reserve particularly expensive resources for the provisioning profile 11 to be functional. For example, an IMSI number and an authentication key Ki must be reserved in equipment of the provisioning network 21 such as for example an HLR or an AuC.

These resources may be reserved for a very long time before being actually used. For example, for the scenario described with reference to FIG. 1, the IMSI number and the key Ki of the provisioning profile 11 installed and activated by the manufacturer 6 of the eUICC card 10 are reserved by the provisioning network 21 upon production of said eUICC card 10, that is to say on a date which may be considerably earlier than the date on which the terminal 1 which integrates said eUICC card 10 is acquired and put into service by the user 4.

Once the provisioning profile 11 has been used to download and/or activate an operational profile 12, it is considerable to release the resources associated with the provisioning profile 11, since the new operational profile 12 can in turn act as a provisioning profile. However, it may be advantageous to maintain a backup profile throughout the life cycle of the terminal 1, to alleviate the case where the connectivity with the new operational profile 12 is no longer functional.

However, an operator 210 of a provisioning network 21 of the first wireless communication system 2 generally has to pay a license to reserve resources such as an IMSI number or a key Ki in equipment of the HLR or AuC type. It can therefore be very expensive for an operator 210 of a provisioning network 21 to reserve these resources permanently when they are only used for short procedures and in infrequent situations (for example for a first configuration of the eUICC card 10, or an accidental loss of connectivity with the current profile).

On the other hand, the operator 210 of a provisioning network 21 cannot necessarily presuppose the location of a terminal 1 integrating an eUICC card 10 at the time when it will need to remotely configure said eUICC card 10. In other words, it must provide coverage for its provisioning network 21 as wide as possible in order to allow establishing a communication between the terminal 1 and the provisioning network 21 regardless of the geographical position of the terminal 1 at the time when the eUICC card 10 of the terminal 1 must be configured remotely. This implies, for example, that the operator 210 of the provisioning network 21 makes numerous roaming agreements with other access networks, but such agreements are particularly expensive and can further evolve over time.

Figure 3:
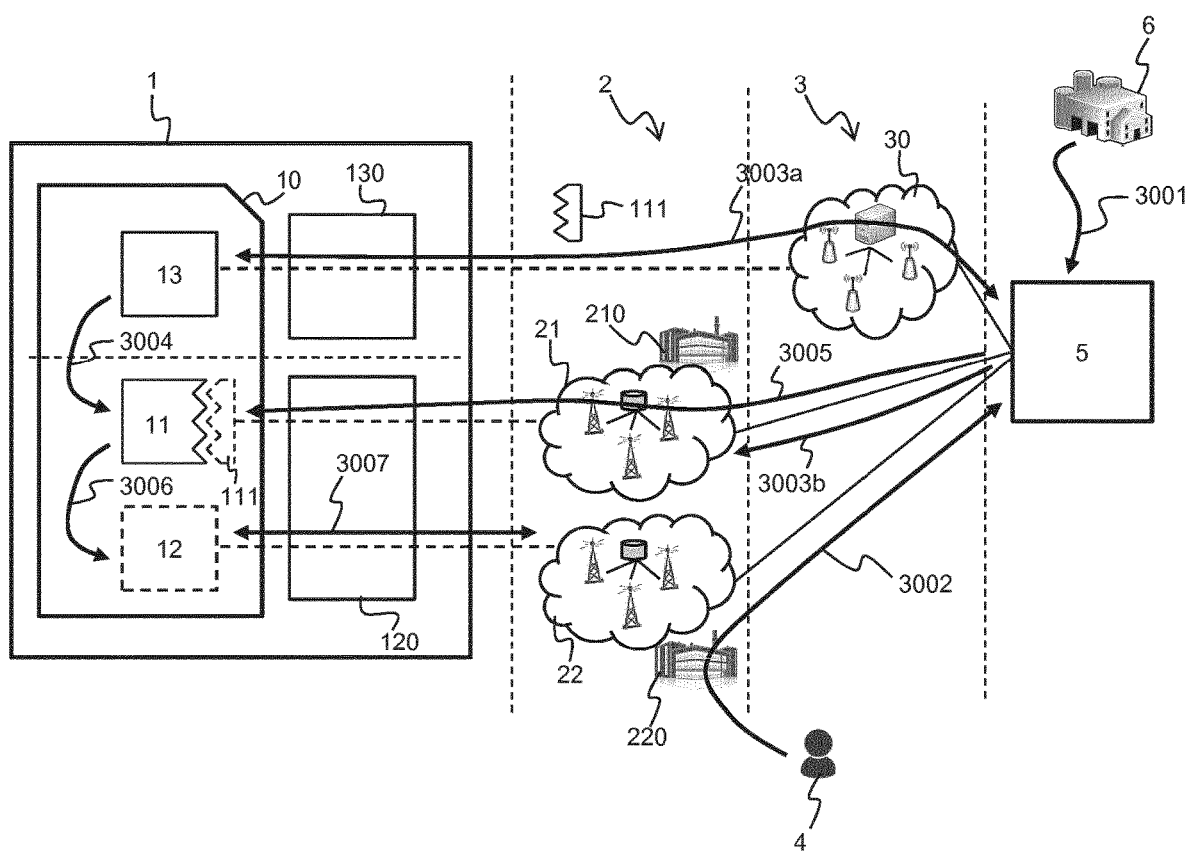
FIG. 3: a schematic representation of a first example of remote configuration of an eUICC card according to the invention.

FIG. 3 schematically illustrates how the present invention overcomes the disadvantages described above.

FIG. 3 shows in particular a terminal 1 for which it is considered, as a non-limiting example, that it is a IoT or M2M-type terminal. The terminal 1 includes an eUICC card 10 which includes a provisioning profile 11 which has the particularity of being incomplete. This means that one or more missing data 111 essential for establishing a communication between the terminal 1 and a provisioning network 21 are not defined by default in the provisioning profile 11. In other words, the missing data are not present in the provisioning profile 11 initially saved on the eUICC card by the manufacturer 6 during the production of the eUICC card.

In particular embodiments, the data 111 missing from the provisioning profile 11 may include, for example, one or more of the following elements:

the indication that profile 11 is active, all or part of an IMSI number allowing to uniquely identify the provisioning profile 11 with the provisioning network 21, an identifier of an authentication algorithm and/or an authentication key Ki of the provisioning profile 11, an identifier of an access network of the first wireless communication system 2, called roaming network, linked to the provisioning network 21.

The eUICC card 10 further includes an assistance profile 13 including applications and data allowing access of said terminal 1 to an access network 30 of a second wireless communication system 3, called assistance network 30. The second wireless communication system 3 is distinct from the first wireless communication system 2. In the following description, the case where said second wireless communication system 3 is a low power wide area and low consumption wireless (LPWAN for "Low Power Wide Area Network") communication network of the ultra narrow band type, is considered as an example and in a non-limiting manner. "Ultra narrow band" (or UNB) means that the instantaneous frequency spectrum of the radio signals emitted by the terminals is of frequency width less than two kilohertz, or even less than one kilohertz. Such UNB wireless communication systems are particularly adapted for applications of the M2M or IoT type.

In such a wireless communication system 3, the data exchanges are essentially one-way, in this case over an uplink between a terminal 1 and the assistance network 30. The terminals 1 of such a communication system 3 generally emit messages which are collected by base stations 31 of the access network 30, without having to be associated beforehand with one or more base stations 31 of the access network 30. In other words, the messages emitted by a terminal 1 are not intended for a specific base station 31 of the access network 30, and the terminal 1 emits its messages assuming that they can be received by at least one base station 31. Such arrangements are advantageous in that the terminal 1 does not need to carry out regular measurements, which are demanding in particular from a power consumption point of view, to determine the most suitable base station 31 for receiving its messages. The complexity is based on the access network 30, which must be capable of receiving messages that can be emitted at arbitrary instants, and on arbitrary central frequencies within a frequency band for multiplexing the various terminals 1.

The cost to maintain a connectivity between a terminal 1 and the access network 30 of such a wireless communication system 3 is generally much lower than the cost to maintain a connectivity between a terminal 1 and an access network 21, 22 of the first wireless communication system 2 of the cellular mobile telephone network type. Furthermore, an access network 30 of such a wireless communication system 3 can propose very wide geographical coverage covering several countries or even several continents at low cost.

As the terminal 1 described with reference to FIG. 1, the terminal 1 represented in FIG. 3 includes a communication module 120 configured to send and receive messages exchanged between the terminal 1 and an access network 21, 22 of the first wireless communication system 2. Furthermore, the terminal 1 shown in FIG. 3 includes a communication module 130 which conventionally includes a set of hardware and/or software means considered to be known to the person skilled in the art, for sending and receiving messages exchanged between the terminal 1 and the assistance network 30 of the second wireless communication system 3.

In other words, the communication module 120 allows, using a provisioning profile 11 or an operational profile 12, establishing communications between the terminal 1 and a provisioning network 21 or an operational network 22 of the first wireless communication system 2, while the communication module 130 allows, using an assistance profile 13, establishing communications between the terminal 1 and an assistance network 30 of the second wireless communication system 3.

The assistance profile 13 includes applications and data allowing access of said terminal 1 to the assistance network 30. It is for example a unique identifier of the terminal 1 or of the communication module 130 with the assistance network 30, an algorithm and a secret key allowing the authentication of the terminal 1 with the assistance network 130, etc. It should be noted that, according to a variant, this data can be located outside the eUICC card 10, for example in the communication module 130. In such a variant, the communication module 130 can nevertheless use encryption or decryption functions conventionally offered by the eUICC card 10 to encrypt or decrypt data which must be securely exchanged between the eUICC card 10 and the subscription management entity 5.

The scenario described in FIG. 3 describes as a non-limiting example the procedure by which a new operational profile 12 can be remotely downloaded, installed and activated on an eUICC card 10 according to the invention.

In this scenario, it is assumed that the manufacturer 6 of the eUICC card 10 has previously made an agreement with an operator of the assistance network 30 so that the assistance profile 13 allows establishing communication between the terminal 1 and the assistance network 30. When producing the eUICC card 10, the manufacturer 6 installs the assistance profile 13 on the eUICC card 10, as well as an incomplete provisioning profile 11, then the eUICC card 10 is then provided to a terminal 1 manufacturer who then integrates said eUICC card 10 into the terminal 1. A prior agreement can be made between the manufacturer 6 of the eUICC card 10 and an operator 210 of a provisioning network 21 associated with the incomplete provisioning profile 11, however, unlike scenarios of the prior art described with reference to FIGS. 1 and 2, some resources such as for example an IMSI number or a key Ki have not yet been allocated to the provisioning profile 11 nor reserved in equipment of the provisioning network 21.

In a step 3001, the manufacturer 6 provides the management entity 5 with the data from the assistance profile 13 and the data from the eUICC card 10 (for example the EID and/or a security key) necessary for establishing a secure communication between the eUICC card 10 and the subscription management entity 5 through the assistance network 30.

In a step 3002, a user 4 who has acquired the terminal 1 takes out a subscription with an operator 220 of an operational network 22. The operator 220 then provides the subscription management entity 5 with all the data necessary to create an operational profile 12 on the eUICC card 10 allowing the terminal 1 to access the operational network 22.

In a step 3003a, a communication is established, using the assistance profile 13 and the communication module 130, between the eUICC card 10 and the subscription management entity 5 through the assistance network 30 in order to obtain the data 111 missing from the incomplete provisioning profile 11. For example, the terminal 1 can recurrently send a request to the assistance network 30 until connectivity is finally available between the terminal 1 and the provisioning network 21.

It should be noted that the communication established in step 3003a between the eUICC card 10 and the subscription management entity 5 can be secured by security protocols recommended by the GSMA standards similar to those used to secure the communication established between the eUICC card 10 and the subscription management entity 5 described with reference to step 1003 of FIG. 1.

The data 111 missing from the provisioning profile 11 of the eUICC card 10 of the terminal 1 is then determined by the subscription management entity 5, optionally using the provisioning network 21. In a step 3003b, before transmitting the missing data 111 to the terminal 1 via the assistance network 30, the subscription management entity 5 communicates them to the operator 210 of the provisioning network 21 so that the associated network resources are reserved in the appropriate equipment.

According to a first example, the data 111 missing from the provisioning profile 11 include an IMSI number and a key Ki. These elements are then allocated by the subscription management entity 5 during step 3003a (for example the subscription management entity 5 has a set of available IMSI numbers associated with the operator 210, and it selects one of them in this set), then they are reserved in the HLR and AuC equipment of the provisioning network 21 during step 3003b.

According to a second example, the incomplete provisioning profile 11 includes an IMSI and a Key Ki, but it is not active. The missing datum 111 then corresponds to the indication that the provisioning profile 11 is active. In this example, the IMSI number and the key Ki are allocated in advance by the operator 210, but they are only reserved in the HLR and the AuC in step 3003b, that is to say when the provisioning profile 11 becomes active. Such arrangements allow reducing the license costs of the operator 210 with the sellers of HLR and AuC equipment by limiting the period during which the IMSI number and the Key Ki are reserved in this equipment.

In a step 3004, the eUICC card 10 updates the incomplete provisioning profile 11 with the obtained data 111. The provisioning profile 11 now allows the terminal 1 to communicate with the provisioning network 21. A procedure for remotely configuring the eUICC card 10 defined according to the GSMA standards can then take place, as described with reference to FIG. 1.

In a step 3005, the subscription management entity 5 establishes secure communication with the eUICC card 10 of the terminal 1 through the provisioning network 21 to download and activate the operational profile 12 on the eUICC card 10.

In a step 3006, the eUICC card 10 installs the operational profile 12. Then, it deactivates the provisioning profile 11 and activates the operational profile 12.

In a step 3007, the eUICC card 10 is now capable of communicating with the operational network 22.

From step 3007, it is the operational profile 12 which acts as a provisioning profile for a possible subsequent configuration of the eUICC card 10. The network resources corresponding to the data 111 which have allowed completing the provisioning profile 11 (for example the IMSI number and the key Ki) can then be freed to reduce the license costs of the operator 210 with the sellers of the HLR and AuC equipment. The data 111 is then erased from the provisioning profile 11 of the eUICC card 10. Thus, it becomes an incomplete provisioning profile 11 again. Such a profile can in particular act as a backup profile in the case where the connectivity between the terminal 1 and the operational network 22 is interrupted (for example if the associated subscription is terminated). In such a case, a scenario identical to that described with reference to FIG. 3 is rolled out to remotely configure the eUICC card 10, just as if it were a first configuration.

In the example considered, the second wireless communication system 3 is a low power network. It is therefore advisable to limit the amount of information to be transmitted over the assistance network 30 to provide the missing data 111. Different solutions are possible to achieve this purpose.

In particular embodiments, part of the IMSI number allowing to identify the operator 210 (the MCC/MNC part "Mobile Country Code/Mobile telephone network Code"

encoded in the form of 5 or 6 digits) is preconfigured in the incomplete profile 11, and only a part corresponding to a subscriber identifier (the MSIN number "Mobile Subscriber Identification Number" of up to 10 digits) is missing.

In particular embodiments, a set of authentication keys Ki are preconfigured in the incomplete provisioning profile 11 and are successively used at each new configuration procedure for the eUICC card 10. For example, it is possible to associate each key Ki of this set with an index so as to have to transmit in step 3005 only the value of the index (which can for example be encoded on only 5 bits if said set has 32 elements) to identify the Key Ki, and not the entire Key Ki (which is generally encoded on 128 bits).

Likewise, it is possible to preconfigure a set of authentication algorithms capable of being used, and to provide from the data 111 an index indicating which algorithm should be used.

In particular embodiments, the provisioning profile 11 can be almost blank, for example if an operator 210 is not a priori determined for the first configuration of the eUICC card 10. In this case, the choice of a particular operator 210 can be determined during step 3003b. Such arrangements allow in particular simplifying the production of eUICC cards 10 for a manufacturer 6, because in this case all the eUICC cards 10 are identical.

In particular embodiments, the subscription management entity 5 uses an information on the current geographical position of the terminal 1 to determine the value of at least one of the missing data 111. For example, the choice of a roaming network linked to the provisioning network 21 to be used preferentially can be determined according to the current geographical position of the terminal 1. Such arrangements can in particular allow a roaming network to be selected for which the agreements of roaming to the provisioning network 21 are the most advantageous in terms of cost.

The information on the geographical position of the terminal 1 can for example correspond to the geographical coordinates (longitude, latitude) of said terminal 1, or else, less precisely, to the identification of a region or a country wherein the terminal 1 is located.

According to a first example, the information on the current geographical position can be determined by the terminal 1 itself. For example, terminal 1 can integrate a receiver of a satellite positioning system (GNSS for "Global Navigation Satellite System") which allows determining the current geographical coordinates (longitude, latitude). In one variant, the information on the geographical position of the terminal 1 can be determined using the communication module 120. Indeed, the communication module 120 can identify the surrounding access networks of the first wireless communication system 2. The MCC/MNC identifier of an access network is indeed broadcast on beacon channels emitted by the base stations of the access network. From this information, it is possible to determine the country (or at least a limited set of candidate countries) wherein terminal 1 is located.

According to a second example, the information on the current geographical position of the terminal 1 can be determined by the assistance network 30, for example thanks to trilateration methods or machine learning methods based on radio power levels received by the base stations 31 of the assistance network 30 for the terminal 1.

The information on the current geographical position of the terminal 1 is for example transmitted by the assistance network 30 to the subscription management entity 5 during step 3003a (in the case where it is initially determined by the terminal 1, the information on the current geographical position of the terminal 1 is transmitted beforehand to the assistance network 30 by the terminal 1).

Figure 4:
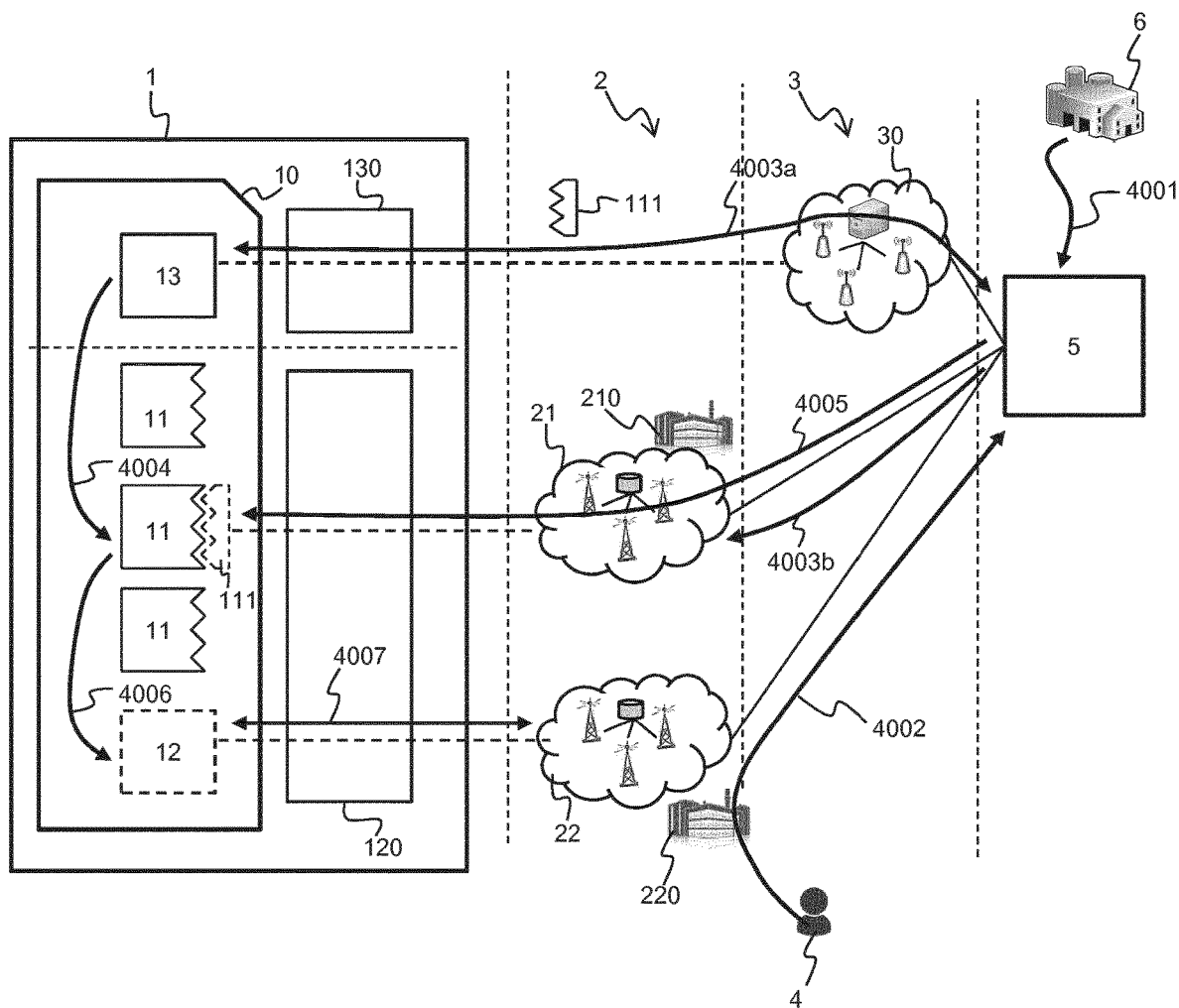
FIG. 4: a schematic representation of a second example of remote configuration of an eUICC card according to the invention.

FIG. 4 shows a particular embodiment of the eUICC card 10 for which several incomplete provisioning profiles 11 are initially installed by the manufacturer 6. Each profile is for example associated with an operator 210 of a different provisioning network 21 (it should be noted that they have not all been shown in FIG. 4 for the sake of simplification of the figure). The provisioning networks 21 associated with the provisioning profiles 11 can for example provide radio coverage in different countries. The provisioning profile 11 to be used, for example for a first remote configuration or else for a configuration in the context of a backup procedure, is then advantageously selected by the subscription management entity 5, for example according to the current geographical position of terminal 1 and/or the current roaming rates.

The steps shown in FIG. 4 are very similar to those described above with reference to FIG. 3.

In a step 4001, the manufacturer 6 records with the management entity 5 the data of the eUICC card 10 and the assistance profile 13 necessary to establish a secure communication between the eUICC card 10 and the subscription management entity 5 through the assistance network 30.

In a step 4002, a user 4 who has acquired the terminal 1 takes out a subscription with an operator 220 of an operational network 22. The operator 220 then provides the subscription management entity 5 with all the data necessary to create on the eUICC card 10 an operational profile 12 allowing the terminal 1 to access the operational network 22.

In a step 4003a, a communication is established, using the assistance profile 13 and the communication module 130, between the eUICC card 10 and the subscription management entity 5 through the assistance network 30 in order to establish a functional provisioning profile 11. An identifier of the provisioning profile 11 to be used as well as the data 111 missing from said provisioning profile 11 are determined by the subscription management entity 5, optionally using the selected provisioning network 21.

In a step 4003b, before transmitting the identifier of the provisioning profile 11 to be used and the missing data 111 to the terminal 1 via the assistance network 30, the subscription management entity 5 ensures with the network operator 210 of the provisioning network 21 that the associated network resources are reserved in the appropriate equipment (for example the HLR and the AuC).

In a step 4004, the eUICC card 10 determines the provisioning profile 11 to be used from the obtained identifier, then updates it with the obtained data 111 and activates it. The provisioning profile 11 now allows the terminal 1 to communicate with the provisioning network 21. A procedure for remotely configuring the eUICC card 10 defined according to the GSMA standards can then take place, as described with reference to FIG. 1.

In a step 4005, the subscription management entity 5 establishes a secure communication with the eUICC card 10 of the terminal 1 through the provisioning network 21 to download the operational profile 12 on the eUICC card 10.

In a step 4006, the eUICC card 10 installs the operational profile 12. Then, it deactivates the provisioning profile 11 and activates the operational profile 12.

In a step 4007, the eUICC card 10 is now capable of communicating with the operational network 22.

Figure 5:
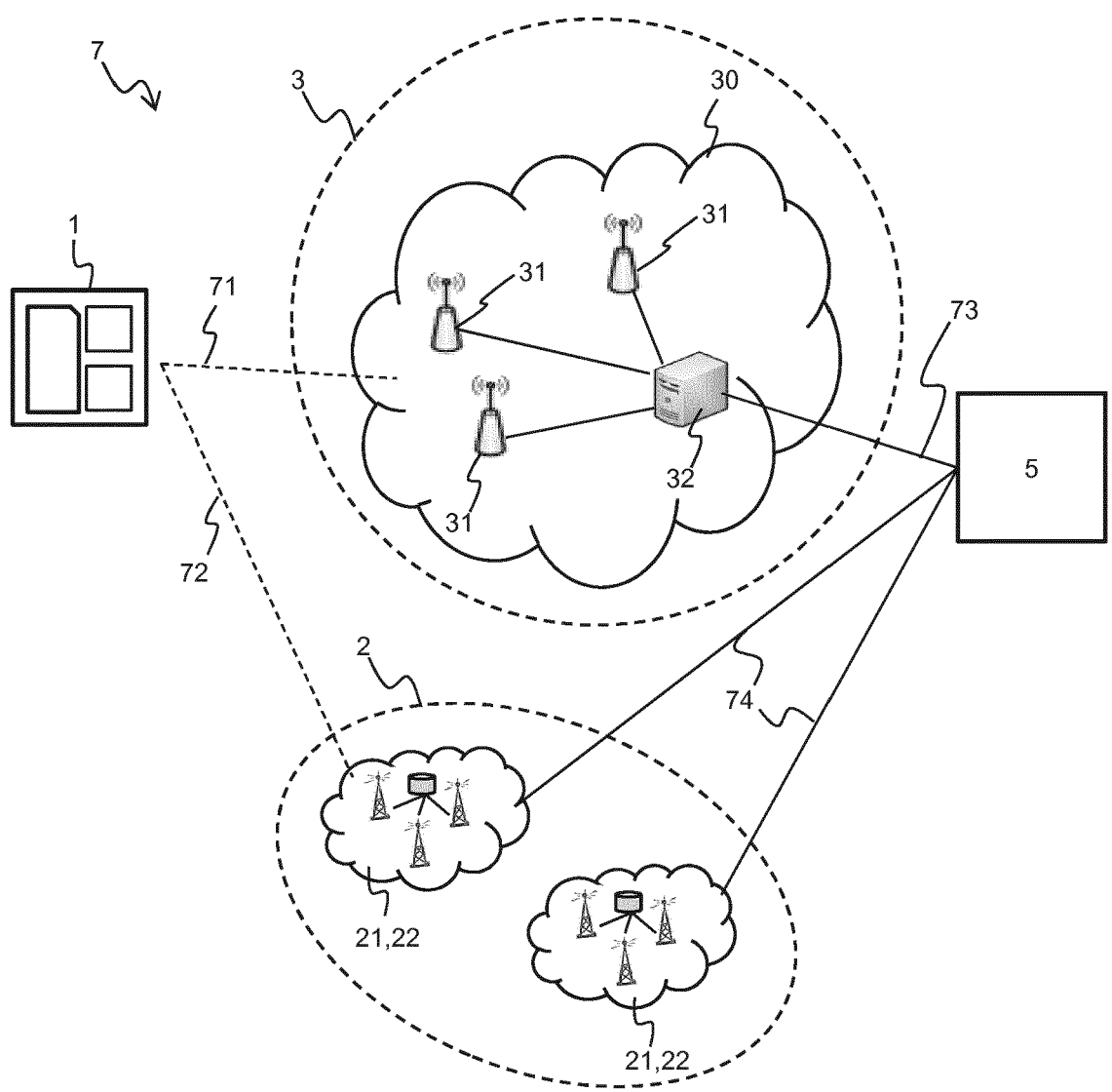
FIG. 5: a schematic representation of a system including the various elements involved in a method for assistance with the remote configuration of an eUICC card according to the invention.

FIG. 5 schematically shows a system 7 including all the elements involved in the remote configuration of an eUICC card 10 of a terminal 1 according to the invention.

As described above with reference to FIGS. 3 and 4, the terminal 1 includes an eUICC card 10 and it is adapted for communicating on the one hand with an access network 21, 22 of the first wireless communication system 2, and on the other hand with the assistance network 30 of the second wireless communication system 3. The assistance network 30 includes base stations 31 linked to a server 32. Each access network 30, 21, 22 is adapted to communicate with a subscription management entity 5. Such a subscription management entity 5 in particular comprises an SM-DP and an SM-SR as defined by the GSMA standards.

The following interfaces are considered to be known to the person skilled in the art:

radio communication interface 72 between the terminal 1 and an access network 21, 22 of the first wireless communication system 2 (this interface is for example widely described by the 3GPP standards for cellular mobile telephone networks), radio communication interface 71 between the terminal 1 and the assistance network 30 of the second wireless communication system 3 (such wireless communication systems for M2M or IoT things are already deployed in many countries), communication interface 74 between an access network 21, 22 and the subscription management entity 5 (the interfaces with the SM-SR and SM-DP entities are defined by the GSMA standards), interface between communication module 120 of the terminal 1 and the eUICC card 10 (this interface is defined by the ETSI and GSMA standards).

The communication interface 73 between the server 32 of the assistance network 30 and the subscription management entity 5 can use protocols similar to those used by the communication interface 74 between an access network 21, 22 and the subscription management entity 5.

Likewise, the interface between the communication module 130 of the terminal 1 and the eUICC card 10 can use protocols similar to those used for the interface between the communication module 120 of the terminal 1 and the eUICC card 10.

Figure 6:
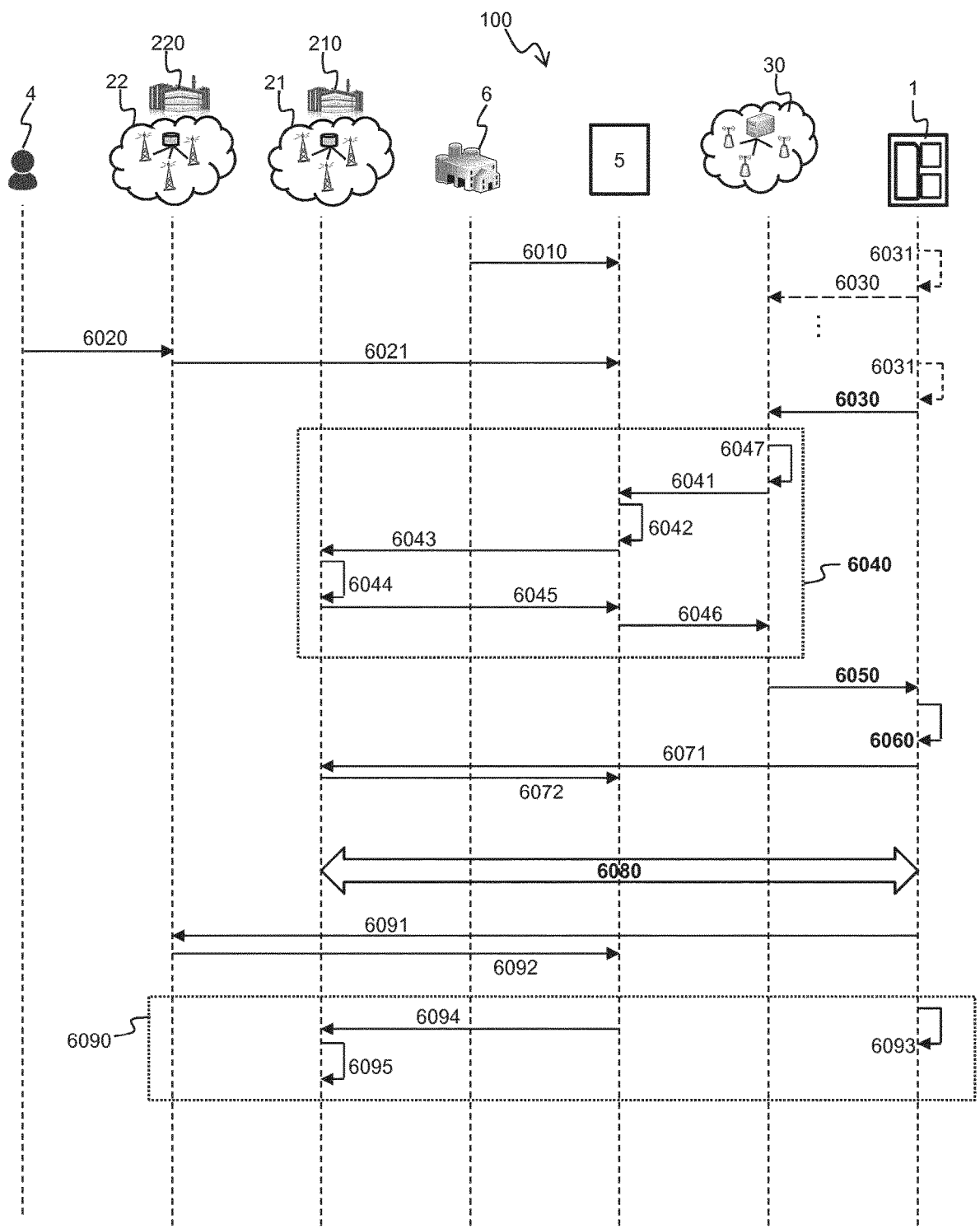
FIG. 6: a schematic representation of the main steps of a method for assistance with the remote configuration of an eUICC card according to the invention.

FIG. 6 shows a sequence diagram illustrating in detail an assistance method 100 implemented by the system 7 for remotely configuring an eUICC card 10 of a terminal 1. Such a method 100 is in particular applicable for the first remote configuration of the eUICC card 10 of the terminal 1 or for a configuration following a loss of connectivity of the terminal 1 (backup procedure).

The main steps of the assistance method 100 are defined below.

In a first step 6010, the manufacturer 6 of the eUICC card 10 provides the management entity 5 with the data of the eUICC card 10 and the assistance profile 13 necessary for establishing a secure communication between the eUICC card 10 and the subscription management entity 5 through the assistance network 30.

In a step 6020, the user 4 possessing the terminal 1 takes out a subscription with an operator 220 of an operational network 22.

In a step 6021, the operator 220 then provides the subscription management entity 5 with all the data necessary to create on the eUICC card 10 an operational profile 12 allowing the terminal 1 to access the operational network 22.

In the considered example shown in FIG. 6, when put into service for the first time, or else if a loss of connectivity with the first wireless communication system 2 is detected, the terminal 1 recurrently sends a request 6030 to the access network 30 for the purpose of completing a provisioning profile 11 of the eUICC card 10. This request 6030 can be repeated regularly, for example several times a day, until a provisioning profile 11 is functional in the eUICC card 10, that is to say until a provisioning profile 11 of said eUICC card 10 allows establishing communication with a provisioning network 21 of the first wireless communication system 2. In one variant, if the assistance network 30 is capable of communicating with the terminal 1 on a downlink, after step 6021, a request can be emitted by the subscription management entity 5 to the terminal 1 through the assistance network 30.

Optionally, in a step 6031, the terminal 1 can determine information on its current geographical position to be transmitted in the request 6030. As previously indicated, this information on the current geographical position of the terminal can for example correspond to geographical coordinates (longitude, latitude) obtained from a receiver of a satellite positioning system integrated into the terminal 1, or else to the identification of a region or a country wherein the terminal 1 is located obtained from one or more identifiers of the surrounding access networks broadcast on beacon channels.

In a step 6047, the assistance network 30 authenticates the terminal 1 using for example an authentication key identical to that contained in the assistance profile 13 of the eUICC card 10 of the terminal 1. Then, it identifies the subscription management entity 5 which manages the eUICC card 10. For example, it is considered here that a one-to-one relationship between a unique identifier (EID) of the eUICC card 10 transmitted in the request 6030 and the subscription management entity 5 managing said eUICC card 10 has been previously recorded in the server 32 of the assistance network 30 after an agreement made between the manufacturer 6 of the eUICC card 10 and the operator of the assistance network 30.

Optionally, the step 6047 can also include determining by the assistance network 30 an information on the current geographical position of the terminal 1, for example if this information cannot be determined by the terminal 1 itself. As indicated previously, this information on the current geographical position of the terminal 1 can for example be determined at the server 32 by trilateration methods or machine learning algorithms based on radio power levels received by the base stations 31 of the assistance network 30 for the terminal 1.

In a step 6041, the assistance network 30 transfers the request, accompanied, where appropriate, with information on the geographical position of the terminal 1, to the subscription management entity 5.

In a step 6042, the subscription management entity 5 determines, in agreement with the operator 210 of the provisioning network 21 and optionally using the information on the geographical position of the terminal 1, the provisioning profile 11 of the eUICC card 10 to be used and/or data 111 missing from the provisioning profile 11. Then, in a step 6043, the subscription management entity 5 communicates this data 111 to the provisioning network 21 so that the latter reserves them, in a step 6044, with the appropriate equipment (for example the IMSI number is reserved in an HLR, and the key Ki is reserved in an AuC), then in a step 6045, a confirmation is emitted to the subscription management entity 5.

In a step 6046, the identifier of the provisioning profile 11 to be used and/or the data 111 missing from the provisioning profile 11 are sent to the server 32 of the assistance network 30.

Thus, a global step 6040 including the sub-steps 6041 to 6047 corresponds to obtaining an identifier of the provisioning profile 11 to be used and/or of the data 111 missing from the provisioning profile 11 by the assistance network 30 with the subscription management entity 5.

In a step 6050, the information thus obtained are sent to the terminal 1 on the assistance network 30.

In a step 6060, the provisioning profile 11 to be used is updated by the eUICC card 10 from the obtained information. This step 6060 can in particular include, according to the examples described above, determining the provisioning profile 11 to be used from the obtained identifier, assigning the value of all or part of an IMSI number to the provisioning profile 11, assigning a key Ki or determining, using an obtained identifier, a key Ki to be used from a set of preconfigured Keys Ki, assigning the value of an identifier of a preferred roaming network, etc.

From there, the provisioning profile 11 allows establishing communication between the terminal 1 and the provisioning network 21. In a step 6071, the eUICC card 10 sends a confirmation through the provisioning network 21 to the subscription management entity 5 that its provisioning profile 11 is functional. This confirmation is then transmitted by the provisioning network 21 to the subscription management entity 5 in a step 6072. It should be noted that in one variant, this confirmation can also be emitted through the assistance network 30.

A step 6080 of remotely configuring the eUICC card 10, as defined by the GSMA standards, can then take place through the provisioning network 21. Such a step 6080 may in particular include, in a conventional manner, steps of authenticating the eUICC card 10 with the subscription management entity 5, establishing a secure communication link between the subscription management entity 5 and the eUICC card 10 by procedures for establishing security keys, downloading and/or activating an operational profile 12 on the eUICC card 10, etc.

Once the operational profile 12 is functional and active on the eUICC card 10, a confirmation that the remote configuration procedure carried out in step 6080 has been successful is emitted by the terminal 1 to the subscription management entity 5 through the operational network 22 (steps 6091 and 6092).

The operational profile 12 now acts as a provisioning profile. The resources which had been reserved for the provisioning profile 11 to be functional can therefore be released in a step 6090 which includes the steps 6093 to 6095 described below.

In a step 6093, the eUICC card 10 erases the data 111 from the provisioning profile 11.

In a step 6094, the provisioning network 21 is in turn informed by the subscription management entity 5 that it can release the network resources which had been reserved so that the provisioning profile 11 is functional. For example, in a step 6095, the IMSI number which had been allocated to the provisioning profile 11 is released in the HLR, and the same is true for the key Ki in the AuC.

In the event of accidental loss of connectivity between the terminal 1 and the operational network 22, a backup method consisting in restoring a provisioning profile 11 can take place. Such a method is then similar to method 100 described with reference to FIG. 6.

It should be noted that, according to another example, an incomplete provisioning profile 11 can possibly also be an operational profile 12, and the user 4 can simply seek to activate this profile. In this case the steps 6080 and the following ones are not necessarily carried out.

The above description clearly illustrates that, by its various features and their advantages, the present invention achieves the objectives set.

Particularly, the fact of being able to provide some missing data to a provisioning profile 11 at the time when the configuration of the eUICC card 10 must take place allows an operator 210 of a provisioning network 21 to avoid having to reserve some resources (such as for example an IMSI number or an authentication key Ki) in equipment of its network (such as an HLR or an AuC) during periods when they are not useful. Thus, this allows reducing costs relating to the reservation of these resources.

Furthermore, the invention allows selecting an optional network of roaming to the provisioning network 21 for which the roaming agreements are the most advantageous in terms of cost at the time when the remote configuration of the eUICC card 10 takes place. This choice can be made according to the geographical position of the terminal if this information is available.

Similarly, the invention allows selecting a particular profile 11 from several provisioning profiles 11 installed on the eUICC card 10 according to the geographical position of the terminal at the time when the remote configuration of the eUICC card 10 takes place. Thus, the most advantageous profile in terms of cost can be selected.

Generally, it should be noted that the embodiments considered above have been described as non-limiting examples, and that other variants are consequently possible.

In particular, the described examples of data missing from a provisioning profile 11 should not be considered as exhaustive.

Also, the invention has been described by considering a terminal 1 of the IoT or M2M type and a second wireless communication system 3 of the low power wide area network and low consumption ultra narrow band type. However, nothing excludes, according to other examples, from considering other types of terminals or other types of wireless communication systems. The second wireless communication system 3 is nevertheless preferably selected so that it allows maintaining a connectivity between an assistance network 30 and the terminal 1 for costs much lower than the costs necessary to maintain connectivity between the terminal 1 and an access network 21 of the first wireless communication system 2.

The invention claimed is:

1. A remotely configurable smart card, called an embedded universal integrated circuit card (eUICC) card, to be non-removably integrated into a terminal storing a provisioning profile comprising data used by said terminal to communicate with a provisioning network of a first wireless communication system to configure an operation profile on the eUICC card, the operational profile comprising data relating to a subscription of the terminal with an operator of an operational network of the first wireless communication system, wherein:

the provisioning profile is incomplete, in that one or more missing data essential to establish a communication between the terminal and the provisioning network are not defined by default in the provisioning profile;

the eUICC card comprises an assistance profile comprising applications and data allowing the terminal to access an assistance network of a second wireless communication system, the second wireless communication system being distinct from the first wireless communication system; and the eUICC card is configured to complete the provisioning profile with the missing data obtained by the terminal by establishing a prior communication with the assistance network.

2. The eUICC card according to claim 1, wherein the missing data comprises at least one of the following elements:
   an indication that the provisioning profile is active;
   at least part of an international mobile subscriber identity (IMSI) of the provisioning profile with the provisioning network;
   an identifier of at least one of an authentication algorithm and an authentication key of the provisioning profile; and
   an identifier of a roaming network of the first wireless communication system linked to the provisioning network.

3. The eUICC card according to claim 1, wherein the provisioning profile comprises a set of possible values preconfigured for at least one missing datum; and wherein an identifier of a value of said set is obtained through the prior communication established between the terminal and the assistance network.

4. The eUICC card according to claim 1, wherein the eUICC card comprises incomplete provisioning profiles; and wherein the eUICC card is configured to determine an incomplete provisioning profile to be used to remotely configure the eUICC card from an identifier obtained through the prior communication established between the terminal and the assistance network.

5. A terminal comprising the eUICC card according to claim 1.

6. The terminal according to claim 5, wherein the terminal is configured to determine an information on a current geographical position of the terminal and to transmit the information on the current geographical position to the assistance network through the prior communication.

7. An assistance network for a terminal according to claim 5, the assistance network being linked to a subscription management entity and comprising a server configured to:
   receive a request from the terminal to obtain the data missing from the incomplete provisioning profile;
   transmit the request to the subscription management entity; and
   transmit to the terminal the data missing from the incomplete provisioning profile.

8. The assistance network according to claim 7, wherein the assistance network is configured to provide an information on a current geographical position of the terminal to the subscription management entity.

9. The assistance network according to claim 7, wherein the assistance network is a low power wide area wireless communication network.

10. A subscription management entity of an eUICC card of a terminal according to claim 5, the subscription management entity being linked to an assistance network and comprising a server configured to receive a request from the terminal to obtain the data missing from the incomplete provisioning profile, to transmit the request to the subscription management entity, and to transmit to the terminal the data missing from the incomplete provisioning profile; and wherein the subscription management entity is configured to receive from the assistance network a request for the data missing from the incomplete provisioning profile of the terminal, and to transmit to the assistance network the data missing from the incomplete provisioning profile.

11. The subscription management entity according to claim 10, wherein the subscription management entity is configured to determine at least one of the data missing from an incomplete provisioning profile of the eUICC card of the terminal according to an information on a current geographical position of the terminal.

12. A system comprising the subscription management entity according to claim 10, at least one terminal, a first wireless communication system and a second wireless communication system distinct from the first wireless communication system; and
   wherein the second wireless communication system comprises the assistance network.

13. A method for assistance with a remote configuration of an eUICC card of a terminal, implemented by the system according to claim 12, and comprising:
   transmitting a request by the terminal on the assistance network of the second wireless communication system to complete a provisioning profile of the eUICC card;
   obtaining information missing from the provisioning profile by the assistance network from the subscription management entity;
   transmitting the obtained information to the terminal on the assistance network;
   updating the provisioning profile with the obtained information by the eUICC card; and
   remotely configuring the eUICC card through the provisioning network of the first wireless communication system using the updated provisioning profile.

14. The method according to claim 13, wherein at least part of the information obtained by the assistance network from the subscription management entity is defined according to an information on a current geographical position of the terminal.

* * * * *